US012778026B2

(12) United States Patent
Cooley

(10) Patent No.: US 12,778,026 B2
(45) Date of Patent: Nov. 3, 2026

(54) ALTERNATE PLANE DOUBLE BALER BALE EJECTION

(71) Applicant: CNH Industrial America LLC, New Holland, PA (US)

(72) Inventor: Devin Cooley, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 203 days.

(21) Appl. No.: 18/910,555

(22) Filed: Oct. 9, 2024

(65) Prior Publication Data

US 2025/0127097 A1 Apr. 24, 2025

Related U.S. Application Data

(60) Provisional application No. 63/545,240, filed on Oct. 23, 2023.

(51) Int. Cl.
*A01F 15/08* (2006.01)

(52) U.S. Cl.
CPC ................................ *A01F 15/0875* (2013.01)

(58) Field of Classification Search
CPC .................................................. A01F 15/0875
See application file for complete search history.

(56) References Cited

U.S. PATENT DOCUMENTS

| | | | | |
|---|---|---|---|---|
| 3,099,203 | A | 7/1963 | Klemm et al. | |
| 8,113,110 | B2 | 2/2012 | Kraus | |
| 10,869,428 | B2 | 12/2020 | Grady | |
| 11,284,567 | B1 * | 3/2022 | Alley | A01F 15/042 |
| 11,576,307 | B2 | 2/2023 | Olander et al. | |
| 2013/0019765 | A1 | 1/2013 | Demon | |
| 2018/0070533 | A1 * | 3/2018 | Lynch | A01D 90/12 |
| 2021/0169011 | A1 | 6/2021 | Grady | |
| 2022/0248608 | A1 | 8/2022 | Grady | |
| 2023/0180668 | A1 * | 6/2023 | Russell | A01F 15/14 56/341 |

* cited by examiner

*Primary Examiner* — Claude J Brown
(74) *Attorney, Agent, or Firm* — Buchanan Ingersoll & Rooney PC

(57) ABSTRACT

An agricultural baler includes a bale chamber and a bale ejection system that includes a chute with a first half portion extending along a first bale axis and a second half portion extending along a second bale axis that is parallel and spaced apart from the first bale axis. The chute receives a first bale and a second bale in the first half portion and the second half portion, respectively. The bale ejection system includes a first ejection ramp aligned with the first half portion of the chute that discharges the first bale along the first bale axis and a second ejection ramp extending from the second half portion of the chute that guides the second bale from the second bale axis to the first bale axis such that the first bale and the second bale are discharged in a single line onto the ground surface of the field.

17 Claims, 4 Drawing Sheets

ALTERNATE PLANE DOUBLE BALER BALE EJECTION

CROSS REFERENCE TO RELATED APPLICATION

This application claims priority to U.S. Provisional Patent Application Ser. No. 63/545,240 filed Oct. 23, 2023, the content of such application being incorporated by reference herein in its entirety.

FIELD OF THE INVENTION

The present invention relates to agricultural balers, and, more particularly, to ejection systems used with square agricultural balers.

BACKGROUND OF THE INVENTION

Agricultural packaging machines, such as balers, for example, are used to consolidate and package crop material so as to facilitate the storage and handling of the crop material for later use. In the case of hay, a mower-conditioner cuts and conditions the crop material for windrow drying in the sun. In the case of straw, an agricultural combine discharges non-grain crop material from the rear of the combine defining the straw (such as wheat or oat straw, for example) which is to be picked up by the baler. The cut crop material is typically raked and dried, and a baler, such as a round baler or a square baler, for example, straddles the windrows and travels along the windrows to pick up the crop material and form it into round or square bales. More specifically, a pickup unit at the front of the baler gathers the cut and windrowed crop material from the ground and then conveys the cut crop material into a bale-forming chamber within the baler where the crop material is compacted, typically by means of a reciprocating plunger. The bale-forming chamber usually includes a device for tying bales and a discharge outlet, for example connected to a discharge chute for gently lowering bales onto the field. During normal baling operation, tied bales are ejected from the baler through action of the plunger.

Square agricultural balers are sometimes preferred because the square-shaped bales facilitate stacking, delivery, and use. During baling, a small square baler produces two small square bales simultaneously, and there is a need to align the ejected bales consecutively in a single row. If the bales are not aligned in a single row, an operator with a bale bundler cannot drive in a straight line to pick up the small square bales, but instead, will have to swerve back and forth to pick up bales that are ejected side by side. It is, therefore, inconvenient if the two simultaneously ejected bales land side by side after being ejected from the bale-forming chamber.

What is needed in the art is an agricultural baler with an ejection system that can position simultaneously ejected bales consecutively along the same path in the field.

SUMMARY OF THE INVENTION

Described herein is an improved ejection system for agricultural balers. The ejection system ensures that simultaneously ejected bales are positioned in the field consecutively along the same path by ejecting one bale at a time.

An agricultural baler includes an ejection system that ejects bales that are discharged simultaneously from the bale-forming chamber one bale at a time. Although both bales slide from the bale-forming chamber onto two half portions of the chute at the same time, only the first bale continues to slide directly off the chute and is ejected onto the ground surface of the field by a short first ejection ramp that is angled downward. The second bale slides down off the chute, but is delayed by a longer second ejection ramp arranged at the bottom end of one of the half portions of the chute. The second ejection ramp includes a first ramp portion that extends outwardly from the end of the bale chamber in the direction of the bale axis to raise the second bale above the plane of the first bale, a second ramp portion that is curved above an ejection end of the first ejection ramp to guide the raised second bale toward the first bale axis, and a third ramp portion that is angled downwardly from the second ramp portion toward the ground surface of the field to cause a downward sliding movement of the second bale onto the ground surface of the field. After the first bale has been ejected by the first ejection ramp onto the ground surface of the field, the second bale first slides over toward the first ejection ramp, and then the second bale is discharged off the chute, in the same line as the first bale, but with a slight delay due to the longer path of the second ejection ramp. This operating sequence results in the placement of the two ejected bales consecutively along the same path on the field.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION OF THE INVENTION

The terms "forward," "rearward," "upward," "downward," "left," and "right," when used in connection with the agricultural baler described herein and/or components thereof are usually determined with reference to the direction of forward operative travel of the towing vehicle and the height of the baler, but they should not be construed as limiting. The terms "longitudinal" and "transverse" are determined with reference to the fore-and-aft direction of the towing vehicle and the width of the baler, and are equally not to be construed as limiting.

Figure 1:
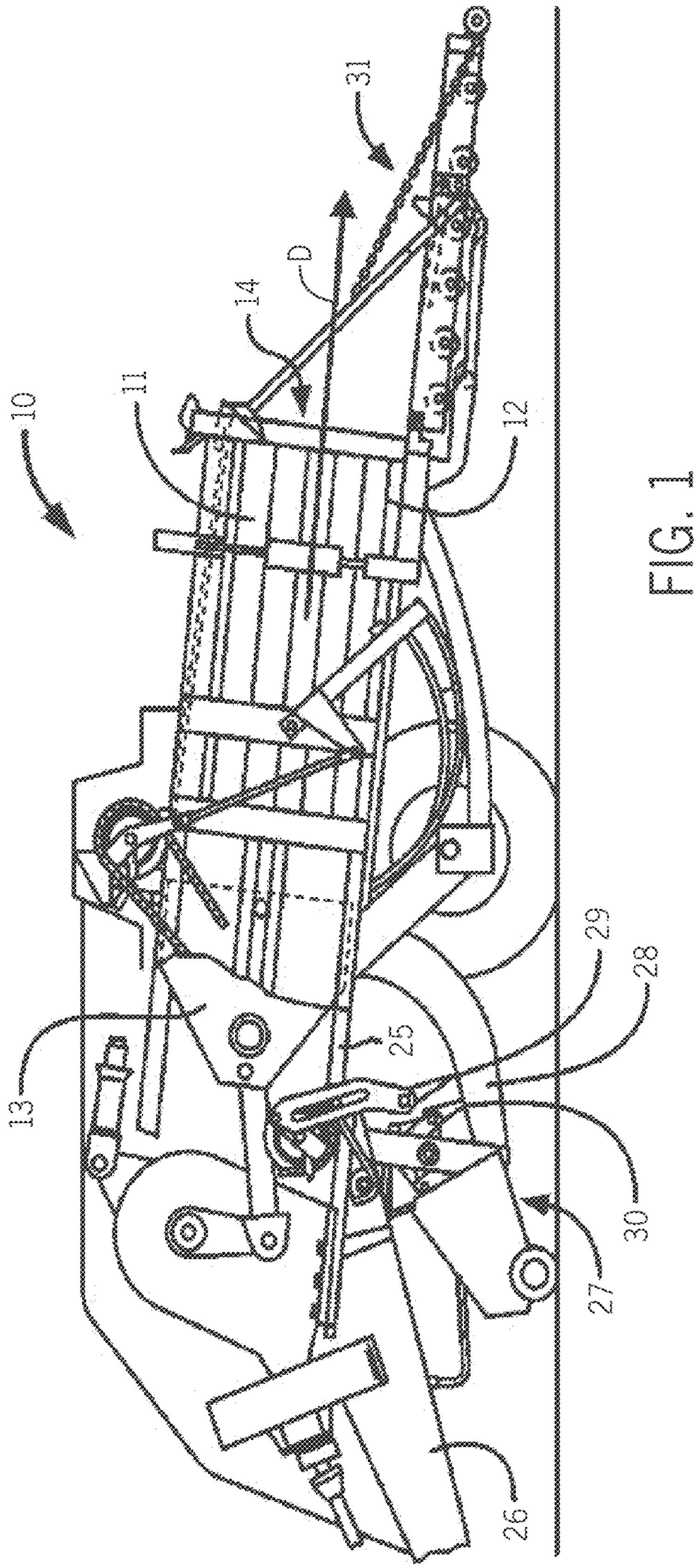
FIG. 1 illustrates an embodiment of a square agricultural baler to which a bale ejection system according to embodiments described herein may be applied.

Referring now to the drawings, and more particularly to FIG. 1, illustrated is an agricultural baler 10, which can be connected to and pulled behind an agricultural vehicle, such as a tractor (not shown), for example. Although the baler illustrated in FIG. 1 and described herein is a large square baler, the bale ejection system described below can be applied to any agricultural baler that produces two bales at the same time. The baler 10 includes a frame 25 which is equipped with a forwardly extending tongue 26 at its front end with hitch means (not shown) for coupling the baler 10 to a towing tractor (shown in FIG. 4).

The baler 10 may operate on a two-stage feeding system. A pick-up assembly 27 lifts windrowed crop material off the field as the baler 10 is being pulled by a tractor, and delivers such material into the front end of a rearwardly and upwardly curved, charge-forming feeder duct 28. The duct 28 communicates at its upper end with an overhead, fore-and-aft extending bale-forming chamber 11 into which crop charges are loaded by a cyclically operating stuffer mechanism 29. A continuously operating packer mechanism 30 at the lower front end of the feeder duct 28 continuously feeds and packs material into the duct 28 as to cause charges of the crop material to take on and assume the internal configuration of the duct 28 prior to periodic engagement by the stuffer 29 and insertion up into the bale-forming chamber 11. Each action of the stuffer mechanism 29 introduces a "charge" or "flake" of crop material from the duct 28 into the chamber 11. The packer mechanism 30 functions as the first stage for crop material compression.

The crop material can be transported into the bale-forming chamber 11 of the baler 10 with a conveyor, such as a rotating conveying rotor, for example. A plunger 13 reciprocates in a fore-and-aft direction 'D' within the bale-forming chamber 11. Biomass fed via the feeder duct 28 is thereby compacted, e.g., compressed or otherwise treated, so as to form rectangular bales in the above-described operation of the agricultural baler 10. These carrier elements are movable so that the bale-forming chamber 11 can initially contract and subsequently expand to maintain an appropriate amount of pressure on the periphery of the bale. The plunger 13 compresses the wads of crop material into flakes to form a rectangular or square bale and, at the same time, gradually advances the bale toward a discharge outlet 14 of the bale-forming chamber 11, from where the bales may eventually be ejected. Together, the plunger 13 and the bale-forming chamber 11 function as the second stage for crop compression.

The baler 10 may include components, such as a tying assembly or a knotter mechanism for automatically wrapping and tying the completed bales with a tie twine or similar lineal object, to make the bales self-supporting, for example for shipping and storage. When enough flakes have been added and the bale reaches a full (or other predetermined) size, the tying assembly is actuated in order to wrap and tie twine around the bales while the bales are still in the bale-forming chamber 11. Once tied, the bales are discharged from the discharge outlet 14 of the bale-forming chamber 11 onto a discharge structure in the form of a chute 31, for gently lowering the bales near ground level onto the field.

Further details of baler 10 may be described in U.S. Patent App. Pub. No. 2013/0019765, which is incorporated by reference herein in its entirety and for all purposes.

In a first aspect, an ejection system 200 is provided for an agricultural baler 10, more particularly a small square baler or a rectangular baler, i.e., a machine for forming square or rectangular bales from agricultural crop material. In a small square baler, for example, the bales can be discharged simultaneously from the discharge outlet 14 of the bale-forming chamber 11, usually with the two bales positioned next to each other or in parallel relative to the side walls of the baler 10.

The ejection system 200 according to embodiments of the present invention may be a separate structure for being added or retro-fitted into an existing agricultural baler. Alternatively, the ejection system 200 may be built into an agricultural baler.

Figure 2:
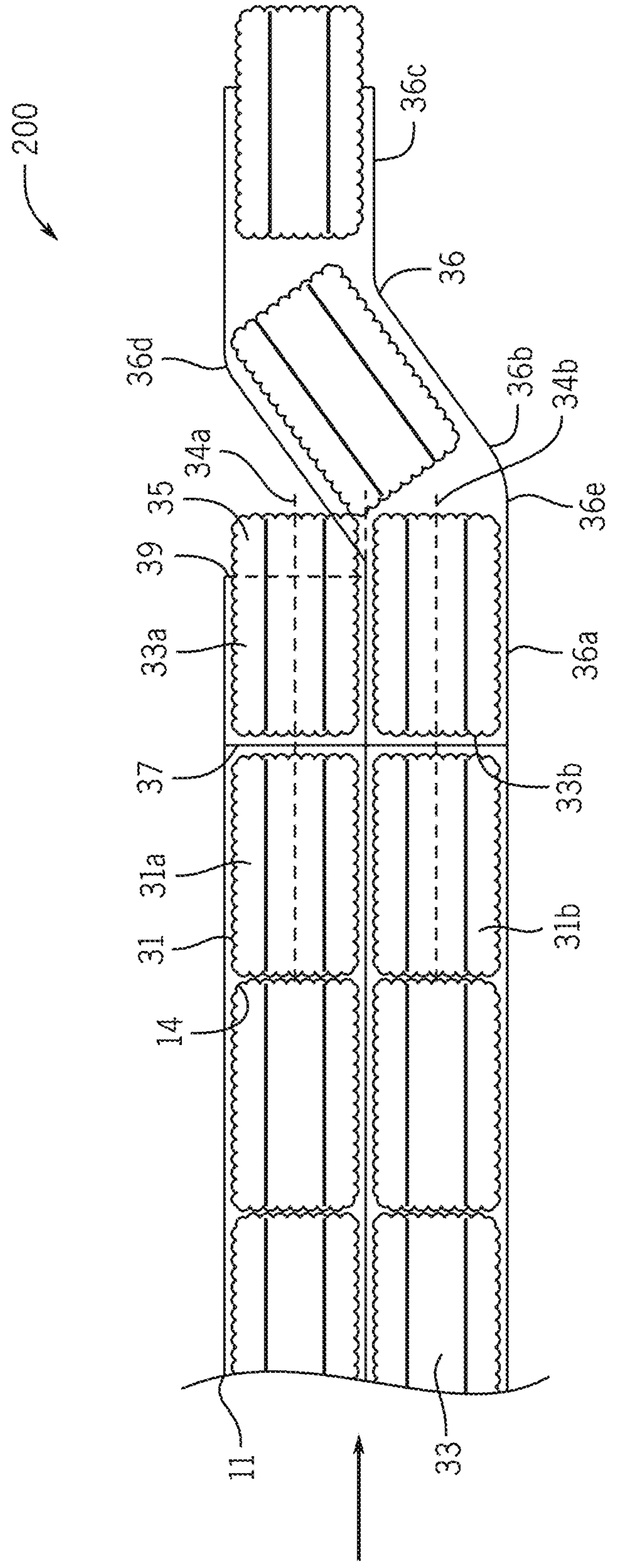
FIG. 2 is a top plan view of a bale ejection system of the baler of FIG. 1, which is shown schematically, according to an embodiment.

According to an aspect of the present invention, and referring now specifically to FIG. 2, a bale ejection system 200 includes bale-forming chamber 11 where formed square bales 33 are arranged in multiple rows of two bales 33 positioned next to each other in each row. A chute 31 (see also FIG. 1) is operatively connected to the discharge outlet 14 of the bale-forming chamber 11 and simultaneously receives bales 33 as the bales 33 are discharged from the discharge outlet 14 of the bale-forming chamber 11. The chute 31 includes two half portions 31*a* and 31*b* (illustrated in FIG. 2 as being separated by an imaginary dashed line). The first half portion 31*a* extends along a first bale axis 34*a* and the second half portion 31*b* extends along a second bale axis 34*b* that is parallel and spaced apart from the first bale axis 34*a*. The first half portion 31*a* includes a first ejection ramp 35 extending downwardly at an angle from the end 37 of the bale-forming chamber 11 toward the ground surface of the field. The first ejection ramp 35 is aligned with the first half portion 31*a* of the chute 31. The second half portion 31*b* includes a second ejection ramp 36. The second ejection ramp 36 extends from the second half portion 31*b* of the chute 31. The second ejection ramp 36 includes at least one of a first ramp portion 36*a*, a second ramp portion 36*b*, and a third ramp portion 36*c*. The first ramp portion 36*a* extends outwardly from the end 37 of the bale-forming chamber 11 in the direction of the second bale axis 34*b* to raise the second bale 33*b* above the plane of the first bale 33*a* on the first half portion 31*a* of the chute 31. For example, the first ramp portion 36*a* can be angled upwardly from the end 37 of the bale-forming chamber 11 to raise the second bale 33*b* above the plane of the first bale 33*a* on the first half portion 31*a* of the chute 31. The second ramp portion 36*b* is curved starting from the first ramp portion 36*a* above an ejection end 39 of the first ejection ramp 35 (see also FIG. 3) to guide the raised second bale 33*b* toward the first bale axis 34*a*. The second ramp portion 36*b* forms an arc that slides the second bale 33*b* over and above the first ejection ramp 35. The third ramp portion 33*c* extends downwardly at an angle from the end 36*d* of the second ramp portion 33*b* toward the ground surface of the field to cause a downward sliding movement of the second bale 33*b* through the third ramp portion 33*c* onto the ground surface of the field in the same single line as the discharged first bale 33*a*.

In operation, two bales 33*a* and 33*b* slide from the bale-forming chamber 11 onto the chute 31 at the same time and substantially parallel to each other. Each of the two bales 33*a* and 33*b* slides out from the bale-forming chamber 11 in the forward and downward direction D1, for example, onto a corresponding half portion 31*a* or 31*b* along the first bale axis 34*a* and along the second bale axis 34*b*, respectively, of the chute 31, and advances by force of gravity toward the ground surface of the field.

The first ejection ramp 35 is configured to discharge the first bale 33*a* along the first bale axis 34*a* and onto the ground surface of the field. The first bale 33*a* continues to slide directly off the chute 31, through the first ejection ramp 35, and onto the ground surface of the field because the first ejection ramp 35 by design is substantially angled downward (see FIGS. 1 and 3). Similarly, a second bale 33*b* slides off the chute 31, through the second half portion 31*b* of the chute 31, down to the bottom end 37 of the second half portion 31*b* of the chute 31, but it advances from there to the first ramp portion 36*a* of the second ejection ramp 36 that is angled upward from the end 37 of the bale-forming chamber 11, and to the second ramp portion 36*b*. The second ejection ramp 36 is configured to guide the second bale 33*b* from the second bale axis 34*b* to the first bale axis 34*a*. The second ramp portion 36*b* can be curved starting from the end 36*e* of the first ramp portion 36*a* above an ejection end 39 of the first ejection ramp 35 to guide the raised second bale 33*b* toward the first bale axis 34*a*. Because of this configuration, the second ramp portion 36*b* guides the raised second bale 33*b* from the second half portion 31*b* of the chute 31 towards the first bale axis 34*a*, or behind the area of the first half portion 31*a* of the chute 31. The second ramp portion 36*b* can be configured in the shape of an arc that extends toward the first bale axis 34*a*. The arc of the second ramp portion 36*b* can be configured in such a way that the end 36*d* of the second ramp portion 33*b* (e.g., the end closer to the third ramp portion 33*c* than to the first ramp portion 33*a*) aligns with the first half portion 31*a* of the chute 31 and with the first bale axis 34*a*. The third ramp portion 33*c* is also aligned with the first half portion 31*a* of the chute 31 and with the first bale axis 34*a*. Because of these alignments, after the second bale 33*b* has been guided over onto the second ramp portion 33*b*, the second bale 33*b* freely slides off the third ramp portion 33*c* and onto the ground surface of the field in the same single line as the discharged first bale 33*a*.

Figure 3:
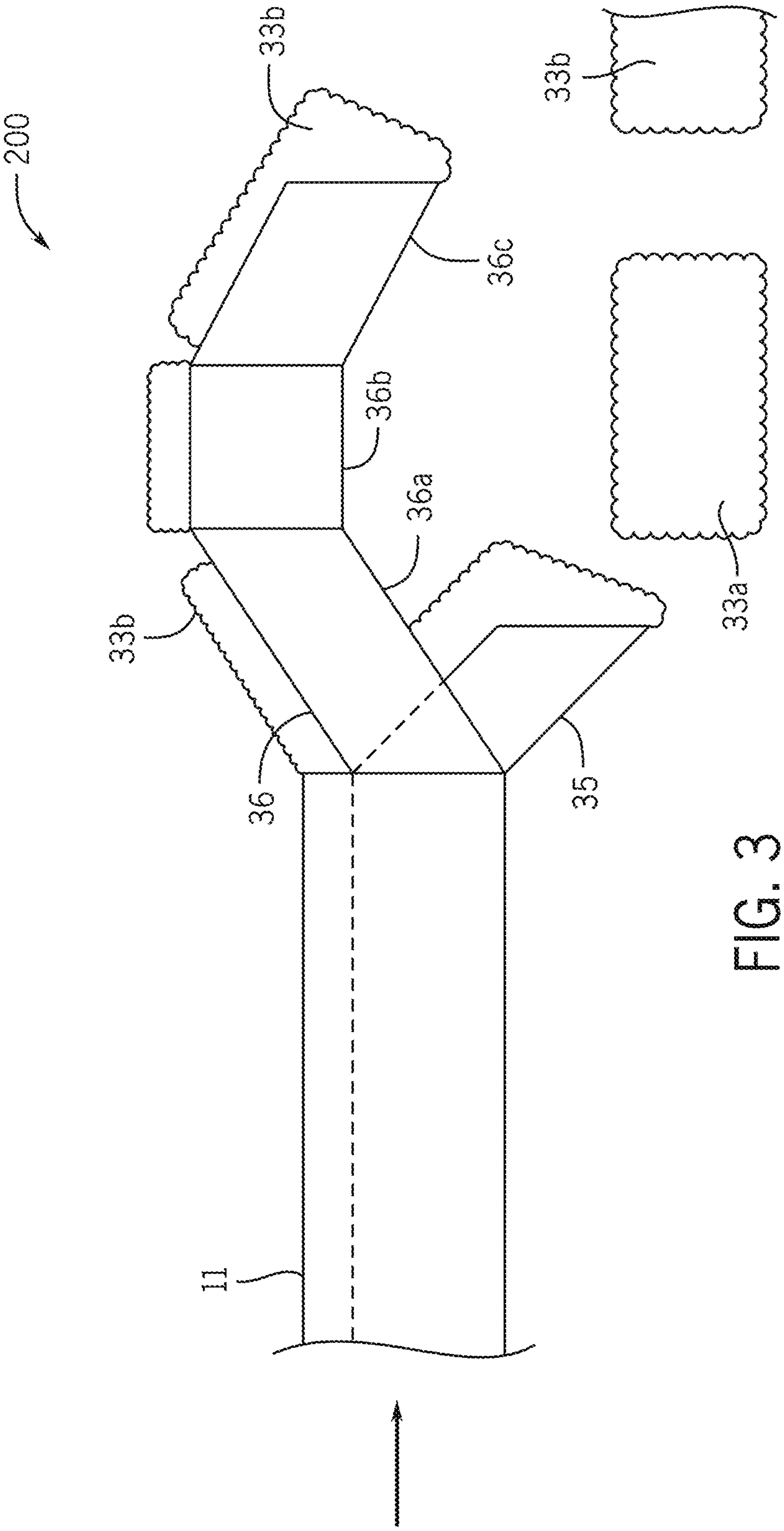
FIG. 3 is a side elevation view of the bale ejection system of FIG. 2.

The first ejection ramp 35 can be shorter than the overall length of the second ejection ramp (e.g., the combined length of the first ramp portion 36*a*, the second ramp portion 36*b*, and the third ramp portion 36*c*). As the baler 10 moves in the fore-and-aft direction behind the towing vehicle (represented by an arrow A in FIG. 4), due to the shorter length and the downward slope of the first ejection ramp 35, the first bale 33*a* is discharged from the chute 31 before the second bale 33*b*. Due to the larger length and the upward slope of the second ejection ramp 36, the second bale 33*b* is discharged behind the first bale 33*a*, but in the same line as the first bale 33*a*, forming a single line (FIG. 3).

The bale-shifting operating sequence of the bale ejection system 200 described herein results in the placement of the two bales (e.g., 33*a* and 33*b*), which are simultaneously ejected from the bale-forming chamber 11, consecutively along the same path or the same line onto the ground surface of the field. Due to the delayed ejection of the second bale 33*b* until after the first bale 33*a* has been ejected from the chute 31 onto the ground surface of the field, the first bale 33*a* and the second bale 33*b* can be ejected in a spaced arrangement relative to each other as the baler 10 moves along the field. The spaced arrangement can be longitudinal and along the same path as the moving direction of the baler 10, due to time delay created by slowing the ejection of the second bale 33*b* relative to the ejection of the first bale 33*a*. The ejection of the bales 33*a* and 33*b* in a spaced arrangement relative to each other and along the same path onto the ground surface of the field facilitates efficient collection of the bales 33 by enabling the operator of a bale bundling equipment to drive in a straight line through the field and pick up both bales, without having to deviate from the driving direction. The arrangement of the ejected bales 33 along the same path on the field allows the same bale bundling equipment to pick up both bales, as opposed to making two trips across the same path if the bales 33 were ejected side by side, in two separate lines.

Figure 4:
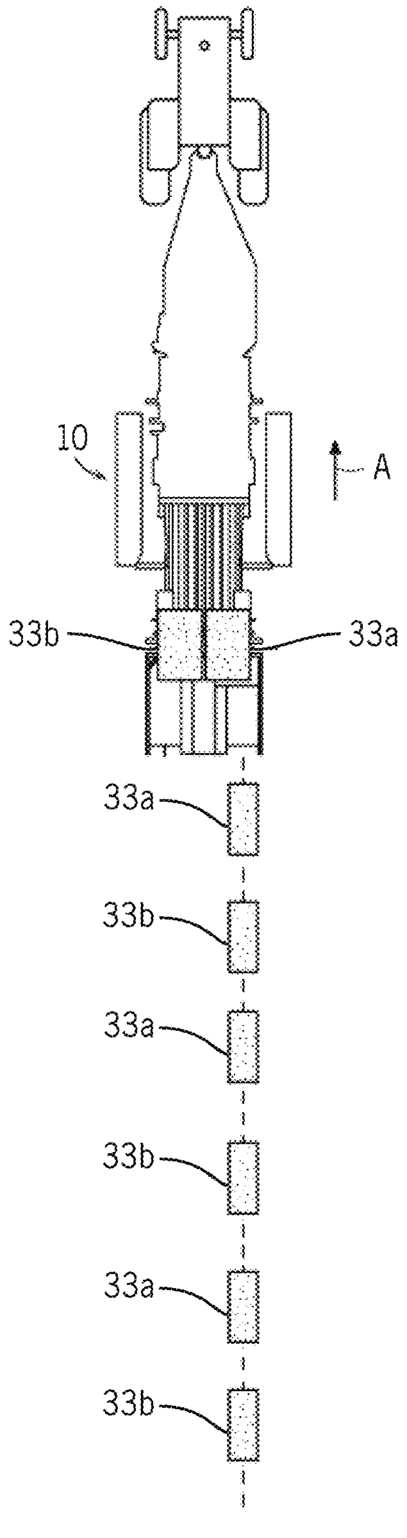
FIG. 4 is a schematic view of the positioning of bales in a field ejected with the bale ejection system according to an embodiment.

The improved ejection of the bales 33*a* and 33*b* along the same path as the moving direction of the baler 10 is illustrated in FIG. 4, for example. In FIG. 4, the movement of the baler 10 along the field is represented by an arrow A. The first bales 33*a* and the second bales 33*b* form a single line of bales behind one of the half portions (e.g., 31*a*) of the chute 31. As the baler 10 moves along the field carrying bales of picked up crop material, the ejection system 200 described herein ejects each of the bales 33*a* and 33*b* in a time-staggered manner to form a single bale collection path, which improves the efficiency of collection of the bales 33 with a single trip along a single collection path.

The ejection system 200 illustrated in the figures and described above can be implemented in any hay and forage agricultural vehicle that harvests a grass type crop, including but not limited to small square baler pickups, or large square baler pickups, for example.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler, comprising:

a bale chamber having a discharge outlet; and a bale ejection system configured to discharge bales from the bale chamber onto a ground surface of a field, the bale ejection system including:

a chute having a first half portion extending along a first bale axis and a second half portion extending along a second bale axis that is parallel and spaced apart from the first bale axis, the chute being configured to receive a first bale in the first half portion along the first bale axis and a second bale in the second half portion along the second bale axis;

a first ejection ramp aligned with the first half portion of the chute and configured to discharge the first bale along the first bale axis and onto the ground surface of the field; and a second ejection ramp extending from the second half portion of the chute, wherein the second ejection ramp is configured to guide the second bale from the second bale axis to the first bale axis such that the first bale and the second bale are discharged in a single line onto the ground surface of the field.

2. The agricultural baler of claim 1, wherein the first ejection ramp is angled downwardly from an end of the bale chamber toward the ground surface of the field to cause a downward sliding movement of the first bale through the first ejection ramp.

3. The agricultural baler of claim 1, wherein the second ejection ramp comprises at least one of a first ramp portion, a second ramp portion, and a third ramp portion.

4. The agricultural baler of claim 3, wherein the first ramp portion extends outwardly from an end of the bale chamber in a direction of the second bale axis to raise the second bale above a plane of the first bale.

5. The agricultural baler of claim 3, wherein the second ramp portion is curved above an ejection end of the first ejection ramp to guide the raised second bale toward the first bale axis.

6. The agricultural baler of claim 3, wherein the second ramp portion forms an arc that guides the second bale toward the first bale axis and to the third ramp portion.

7. The agricultural baler of claim 3, wherein an end of the second ramp portion is aligned with the first half portion of the chute.

8. The agricultural baler of claim 3, wherein the third ramp portion is angled downwardly from the second ramp portion toward the ground surface of the field to cause a downward sliding movement of the second bale through the third ramp portion in the single line onto the ground surface of the field.

9. The agricultural baler of claim 3, wherein the third ramp portion is configured to discharge the second bale onto the ground surface of the field in the same single line as the discharged first bale.

10. The agricultural baler of claim 3, wherein the third ramp portion is aligned with the first half portion of the chute.

11. The agricultural baler of claim 3, wherein the first ejection ramp has a shorter bale path than the second ejection ramp, and wherein the first bale is discharged before the second bale.

12. The agricultural baler of claim 1, wherein the bale ejection system is a separate structure configured to be added or retro-fitted into the agricultural baler.

13. The agricultural baler of claim 1, wherein the bale ejection system is built into the agricultural baler.

14. An agricultural vehicle comprising the agricultural baler of claim 1.

15. A bale ejection system, comprising:

a chute having a first half portion extending along a first bale axis and a second half portion extending along a second bale axis that is parallel and spaced apart from the first bale axis, the chute being configured to receive a first bale in the first half portion along the first bale axis and a second bale in the second half portion along the second bale axis;

a first ejection ramp aligned with the first half portion of the chute and configured to discharge the first bale along the first bale axis and onto the ground surface of the field; and a second ejection ramp extending from the second half portion of the chute, wherein the second ejection ramp is configured to guide the second bale from the second bale axis to the first bale axis such that the first bale and the second bale are discharged in a single line onto the ground surface of the field.

16. The bale ejection system of claim 15, wherein the bale ejection system is configured to be coupled to an agricultural baler.

17. The bale ejection system of claim 16, wherein, the agricultural baler includes a bale chamber having a discharge outlet, and the bale ejection system is configured to discharge bales from the bale chamber onto a ground surface of a field.

* * * * *